United States Patent [19]

Campiotti

[11] Patent Number: 5,088,446
[45] Date of Patent: Feb. 18, 1992

[54] ANIMAL ACTIVITY APPARATUS

[75] Inventor: Alfredo Campiotti, Malnate, Italy

[73] Assignee: Techniplast S.a.r.l., Buguggiate, Italy

[21] Appl. No.: 507,441

[22] Filed: Apr. 11, 1990

[30] Foreign Application Priority Data

Jan. 10, 1990 [IT] Italy .................................. 19037 A190

[51] Int. Cl.⁵ ............................................. A01K 31/00
[52] U.S. Cl. ..................................................... 119/17
[58] Field of Search ................. 119/15, 17, 29; 272/3, 272/4

[56] References Cited

U.S. PATENT DOCUMENTS

| Re. 18,273 | 12/1931 | Freer | 119/17 |
|---|---|---|---|
| 38,177 | 4/1863 | Osborn | 119/29 X |
| 1,794,951 | 3/1931 | Freer | 119/17 |
| 3,682,477 | 8/1972 | Harkins | 119/29 X |
| 3,788,277 | 1/1974 | Willinger et al. | 119/29 |
| 3,994,262 | 11/1976 | Suchowski et al. | 119/17 X |
| 3,998,187 | 12/1976 | Rodemeyer | 119/29 |
| 3,999,519 | 12/1976 | Rodemeyer | 119/15 X |
| 4,640,228 | 2/1987 | Sedlacek et al. | 119/15 |

Primary Examiner—Gene Mancene
Assistant Examiner—R. Thomas Price

[57] ABSTRACT

A stalling cage for small rodents includes a rotatably supported wheel for measuring the activity of the rodent. This cage contains food and drink dispensers for stalling the rodent and a rotary wheel for measuring activity of the rodent. This cage avoids the need for separate stalling cages and activity measurement cages.

15 Claims, 3 Drawing Sheets

ANIMAL ACTIVITY APPARATUS

BACKGROUND OF THE INVENTION

This invention relates to a cage for stalling small rodents, and more specifically to a stalling cage to which a wheel or rotary cage can be adopted for activity measurement purposes. Tests for measuring the therapeutic activity of a drug and the relative side effects conducted on small animals such as guinea pigs, mice, and rats are very important. In measuring the therapeutic activity of a drug, or test animals the reactions of rodents are usefully studied, sometimes starting from a time immediately subsequent to the administration of the drug. Stalling cages already fitted with food and drink dispensers are available commercially, as are wheels or rotary cages for activity measurement. However, in the latter cases these are generally sold separately as a consequence, the rodent has to be immediately transferred from the stalling cage to the wheel after drug administration in order to measure its activity. In addition, the already available activity measurement cages are not suitable for long or medium term study as they are not equipped for food administration and do not have the legally prescribed base area and height availability. Furthermore transferring of the animal not only results in shock to its system with possible falsification of the activity test results, but can also create problems for the operator in that depending on the type of drug administered, the animal can become nervous to a greater or lesser extent and can bite the operator transferring it. In addition, the need for different cages for stalling and activity measurement can create space problems in the laboratories conducting this type of test. Furthermore, the rotary cages of the known art have a drawback in that ball bearings are used to eliminate friction between a pivot pin and the sleeve in which it rotates. Such rotary cages are often sterilized in autoclaves at 120°-130° C. causing the ball bearing lubricating grease to disappear. This results in the drawback that with the passing of time the rotary cage becomes noisy with the result that those animals contained in nearby cages move by imitation rather than spontaneously and in addition the rodent is liable to become nervous to the detriment of the activity test.

SUMMARY OF THE INVENTION

There is, therefore, a requirement for an arrangement which obviates all of the aforesaid drawbacks and, in particular one which enables activity measurement wheels to be adapted to a conventional stalling cage. The present invention, therefore, provides a stalling cage to which a means is fitted for rotatably supporting the activity measurement cage. According to a preferred embodiment of the present invention the means fitted to the stalling cage to rotatably support the activity measurement cage comprises a pivot pin. According to a further preferred embodiment of the present invention the stalling cage is fitted with an auxiliary element which can be fixed to the stalling cage with which the pivot pin is made rigid. This auxiliary element consists in particular of a pivot pin support wall which is fixed to a tray wall of the stalling cage by a hook. Moreover, it has been determined that it is possible to dispense with the use of ball bearings in the rotary cage by inserting a teflon bush between the metal sleeve and the pivot pin, thus making the unit sterilizable and noiseless over a long period.

BRIEF DESCRIPTION OF THE DRAWINGS

The present invention will become more fully understood from the detailed description given herein and below and the accompanying drawings which are given by way of illustration only, and thus, are not limitative of the present invention, and wherein:

FIG. 2 is a section on the line II—II of FIG. 1, FIG. 1 is a front view and FIGS. 3 and 4 show some details of the embodiment to an enlarged scale.

DETAILED DESCRIPTION OF THE INVENTION

Figure 1:
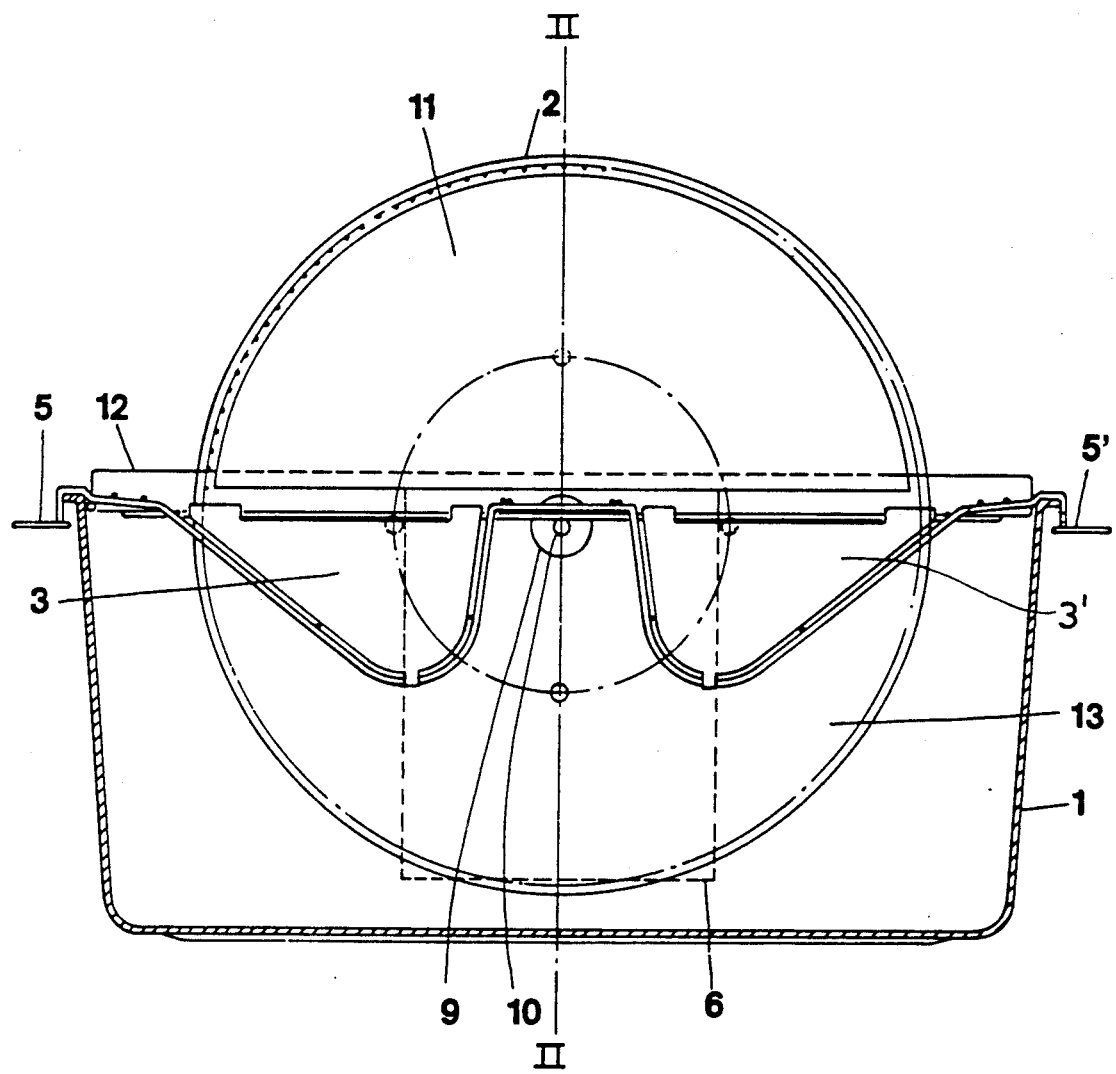
FIG. 1 is a front view of the stalling cage of the present invention.
Figure 2:
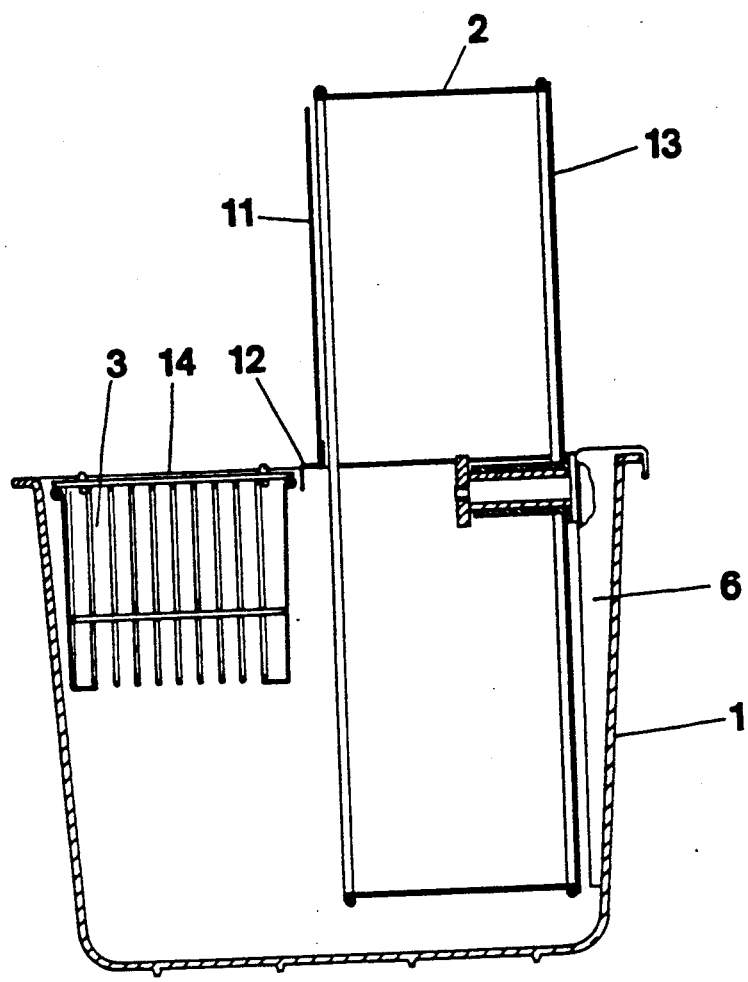
FIG. 2 is a sectional view of the embodiment of FIG. 1 taken along the line II—II.
Figure 3:
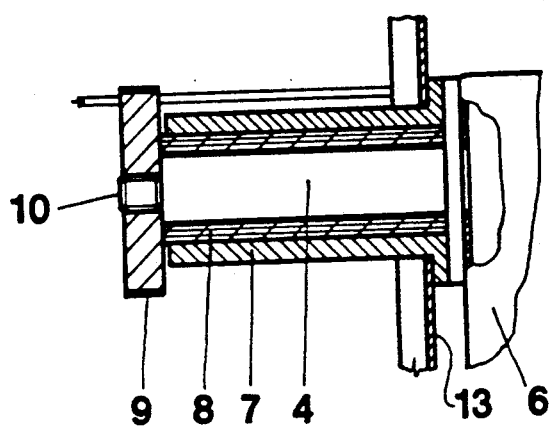
FIG. 3 is an enlarged view of the pivoting means.
Figure 4:
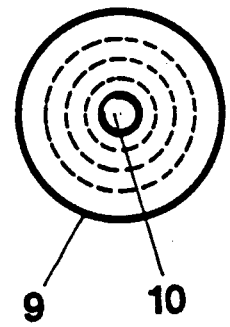
FIG. 4 is an enlarged end view of the pivoting means.
Figure 5:
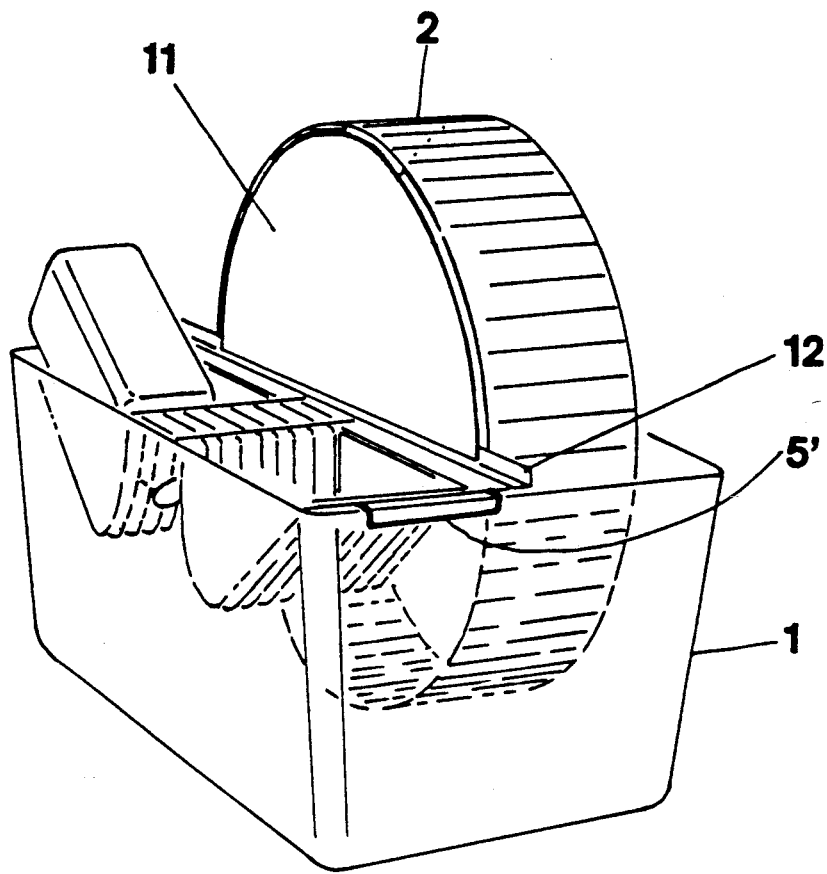
FIG. 5 is a perspective view of the stalling cage of the present invention perspective view.

Referring now to the illustrations a stalling cage housing 1 which is constructed of a plastic material such as polycarbonate, polypropylene, a polypropylene copolymer, or polystyrene; includes a rotary cage or wheel 2 for activity measurement, consisting of an electrowelded wire and a sheet metal disc 13 provided with holes at various points for measuring spontaneous activity by photoelectric or magnetic sensors. A pivot pin 4 enables the wheel 2 to rotate, the pin 4 being inserted into a teflon anti-friction bushing 8 which is itself inserted into a metal sleeve 7 fixed to the wheel 2. The pin 4 terminates with a threaded end 10 on which a nut 9 is mounted, the pin 4 being welded to a pin support wall 6 (an auxiliary element) which is attached to the wall of the lower end of the pin support wall 6 abutting the cage housing; the stalling cage housing 1 by the hooks on 5; the stalling cage housing 1 is partly covered with a cover 14 of electrowelded wire, which is shaped to provide the spaces for the food dispenser 3 and the seat for the drink dispenser 3', these being opposite each other. A profiled sheet metal bar 12 on which a semicircular or rectangular sheet metal cover 11 is welded in a vertical position prevents the laboratory animal from escaping from the top of the wheel. With the embodiment of the present invention it is therefore possible to directly measure the activity of rodents even immediately after drug administration without having to transfer the rodent to another cage, and to conduct medium and long term studies, while at the same time obviating the space problems arising from the presence of two different types of cage.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A stalling cage comprising in combination:
   a cage housing;
   a rotary activity cage rotatably and unilaterally supported within said cage housing by a pivot pin; and an auxiliary element having a pivot pin support wall to which said pivot pin is fixed, said pivot pin support wall being positioned between the rotary cage and a wall of the cage housing, said pivot pin support wall being attached at an upper end thereof to the cage housing wall by a hook, and a lower end of the pivot pin support wall abuts the cage housing wall whereby the pivot pin support wall through the pivot pin firmly holds said rotary cage within said stalling cage.

2. The stalling case as recited in claim 1, further comprising a teflon bushing inserted between said pivot pin and a sleeve for said pivot pin, the sleeve being fixed to the rotary cage.

3. The stalling cage as recited in claim 1, further including a food and drink dispenser member.

4. The stalling cage as recited in claim 3, wherein the food and drink dispenser member is positioned adjacent the rotary cage within the rotary cage housing, the rotary cage being positioned between the food and drink dispenser member and the pivot pin support wall.

5. The stalling cage as recited in claim 3, wherein the food and drink dispenser member has two seats opposed to one another, one seat being for a food dispenser and one seat being for a drink dispenser, both seats being adjacent the rotary cage.

6. The stalling cage as recited in claim 3, wherein the cage housing has a bottom and wherein the food and drink dispenser member is positioned above and out of contact with the bottom of the cage housing.

7. The stalling cage as recited in claim 3, further comprising a cover for closing an upper portion of one side of the rotary cage, the cover being mounted to the food and drink dispenser member.

8. The stalling cage as recited in claim 1, wherein the pivot pin extends from only one side of the rotary cage, an other side of the rotary cage being free of the pivot pin, a portion of the pivot pin extending from the rotary cage being attached to the pivot pin support wall.

9. The stalling cage as recited in claim 1, wherein the pivot pin has first and second ends, the first end of the pivot pin being located within the rotary cage and the second end being attached to the pivot pin support wall whereby said pivot pin extends only through one side of the rotary cage.

10. The stalling cage as recited in claim 1, wherein the pivot pin support wall abuts the cage housing wall generally along an entire length of the pivot pin support wall and said pivot pin support wall prevents wobbling of the rotary cage during rotation thereof.

11. The stalling cage as recited in claim 10, wherein the rotary cage has a predetermined diameter and the pivot pin support wall generally has a length equal to about one-half the diameter of the rotary cage.

12. An auxiliary element consisting of a wall to which a pivot pin means for rotatably supporting a rotary cage in a stalling cage housing is secured, said wall being attachable at an upper end thereof to said stalling cage housing by a hook, a lower end of the wall abutting the stalling cage housing to firmly hold the rotary cage within the stalling cage housing.

13. The auxiliary elements as recited in claim 12, wherein the wall abuts the stalling cage housing generally along an entire length of the wall thereby preventing wobbling of the rotary cage during rotation thereof.

14. The auxiliary element as recited in claim 12, wherein the pivot pin means includes a pivot pin, the pivot pin being attached to the wall and extending through a side of rotary cage into the rotary cage such that the pivot pin unilaterally supports the rotary cage.

15. The auxiliary element as recited in claim 12, wherein the pivot pin means includes a pivot pin extending through only one side of the rotary cage and being affixed to the wall.

* * * * *

UNITED STATES PATENT AND TRADEMARK OFFICE
CERTIFICATE OF CORRECTION

PATENT NO. : 5,088,446
DATED : February 18, 1992
INVENTOR(S) : Alfredo Campiotti It is certified that error appears in the above-identified patent and that said Letters Patent is hereby corrected as shown below:

On the title page, item (73), change the name of the assignee from "Techniplast S.a.r.l." to:
--TECNIPLAST GAZZADA S.a.r.l.--

Signed and Sealed this

Fifth Day of July, 1994

Attest:

BRUCE LEHMAN

*Attesting Officer*         *Commissioner of Patents and Trademarks*